United States Patent [19]

Marie

[11] 4,211,471

[45] Jul. 8, 1980

[54] MODE CONVERTERS FOR CONVERTING A NON-CONFINING WAVE INTO A CONFINING WAVE IN THE FAR INFRARED RANGE

[76] Inventor: Georges R. P. Marié, 17, Avenue R. Croland, Fontenay-aux-Roses, France, 92260

[21] Appl. No.: 973,600

[22] Filed: Dec. 27, 1978

[30] Foreign Application Priority Data

Dec. 28, 1977 [FR] France ................. 77 39448

[51] Int. Cl.² .............................. G02B 5/00
[52] U.S. Cl. ..................... 350/147; 350/152
[58] Field of Search ............... 350/147, 152, 157

[56] References Cited

U.S. PATENT DOCUMENTS

| 3,439,968 | 4/1969 | Hansen et al. | 350/147 |
| 3,892,469 | 7/1975 | Lotspeich | 350/157 |
| 3,892,470 | 7/1975 | Lotspeich | 350/157 |
| 4,175,830 | 11/1979 | Marie | 350/157 |

*Primary Examiner*—John K. Corbin
*Assistant Examiner*—R. A. Rosenberger
*Attorney, Agent, or Firm*—Abraham A. Saffetz

[57] ABSTRACT

Laser device emitting a far infrared wave beam having a mode confining for charged particles. The laser devices of this kind generally emit circular polarized wave beams in which the phase shift of the radioelectric oscillation at a point having a given azimuth with respect to the beam axis is proportional to the azimuth. They comprise a quarter wave plate for converting a linear-polarized wave to a circular polarized wave and a non-confining to confining mode converter. The known converters use birefringent materials but there is no birefringent material available in the far infrared range. The present non-confining to confining mode converter uses dielectric parallel sided plates having a metal coated face forming a mirror.

4 Claims, 8 Drawing Figures

MODE CONVERTERS FOR CONVERTING A NON-CONFINING WAVE INTO A CONFINING WAVE IN THE FAR INFRARED RANGE

BACKGROUND OF THE INVENTION

1. Field of the Invention

The invention relates to devices converting a particle non-confining wave into a particle confining wave, the non-confining wave being emitted by a laser in the far infra-red, more particularly by a carbon dioxide laser.

2. Description of the Prior Art

Devices of the aforementioned kind generating confining waves, more particularly circular-polarized waves having a phase shift proportional to the azimuth are known inter alia from U.S. application Ser. No. 863,235 filed by the present Applicant on Dec. 22, 1977. The known devices comprise a laser proper, emitting a non-confining wave, a quarter-wave plate and a mode converter for converting the non-confining wave into a confining wave. The aforementioned patent application described two kinds of mode converter. The first kind uses an isotropic material transparent to the laser wave and in the form of a helix or spiral staircase, the pitch of the helix or the height of the steps being suitably determined. The other kind of mode converter uses a material which is birefringent at the laser frequency and is cut into sectoral segments which are fitted together to form circular discs, the slow and fast axes of the birefringent material in each sector having a predetermined orientation relative to the bisector of the sector. Since no known material is birefringent in the far infra-red, quarter-wave plates of birefringent material and mode converters of the second kind, which are also of birefringent material, cannot be used in the far infra-red. On the other hand, some existing isotropic materials are transparent to waves at a wavelength of 10 μm.

The object of the invention is to provide a device generating a confining wave at a wavelength near 10 μm, wherein the device converting a rectilinear polarized wave into a circular polarized wave is made of isotropic material transparent to the laser wave.

SUMMARY OF THE INVENTION

The "rectilinear-circular" converter is a parallel sided plate transparent to the laser wave, metal-coated on one side and receiving the laser wave at an incidence near the Brewster incidence. We shall show that if the index of refraction and the thickness of the plate are suitably determined, this parallel sided plate acts as a quarter-wave or half-wave plate.

BRIEF DESCRIPTION OF THE DRAWINGS

The invention will now be described in detail with reference to the accompanying drawings in which.

DESCRIPTION OF THE PREFERRED EMBODIMENTS

Figure 1:
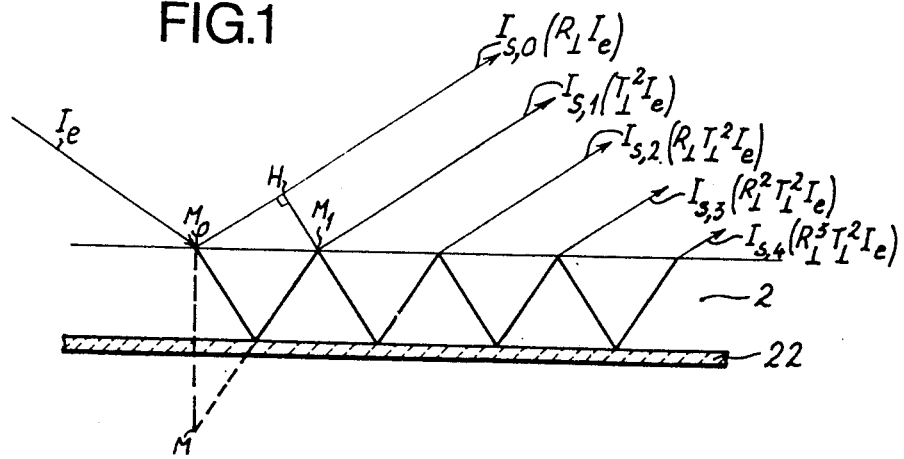
FIG. 1 shows a metal-coated plate having parallel surfaces operating at Brewster incidence.

A metal mirror coated with a thin layer of dielectric and operating as a quarter-wave plate When a plane wave meets a plane dioptric element, i being the angle of incidence and r being the angle of refraction, the field reflection coefficients are given by the Fresnel formulae:

$$R_\perp = \frac{\sin(i-r)}{\sin(i+R)} \tag{1}$$

for the wave having an electric field perpendicular to the plane of incidence, and $$R_{//} = \frac{tg(i-r)}{tg(i+r)} \tag{2}$$

for the wave having an electric field parallel to the plane of incidence. The coefficient of reflection $R_{//}$ cancels out when i and r are complementary and hence $\cos i = \sin r$ and $\sin i = \cos r$ and, by the sine law—i.e. $\sin i = n \sin r$, we obtain:

$$tg\, i = n \quad tg\, r = 1/n \tag{3}$$

The thus-defined angle of incidence is called the Brewster angle.

When an isotropically polarized plane wave strikes a parallel sided plate at the Brewster angle of incidence, the transmitted and reflected waves are strongly polarized, since the component having an electric field parallel to the plane of incidence travels through the two dioptric systems without being reflected, whereas in the case of the component having an electric field perpendicular to the plane of incidence, the coefficient of reflection $R_\perp$ of each dioptric element is:

$$R_\perp = \sin Y = \frac{\sin(i-r)}{\sin(i+r)} = \frac{n^2-1}{n^2+1} \tag{4}$$

If one of the faces of the parallel sided plate is metal-coated to form a mirror (FIG. 1), the wave polarized parallel to the plane of incidence travels through the dioptric plane without being reflected, is reflected at the mirror and comes out through the dioptric plane without being further reflected. The wave polarized perpendicular to the plane of incidence undergoes multiple reflections at the dioptric plane and at the mirror. If $I_e$ denotes the amplitude of the incident wave polarized perpendicular to the incident plane and if, with reference to FIG. 1, the amplitude of the wave $I_{s,l}$ reflected once on the dioptric plane is $R_\perp \chi I_e$ and the amplitude of the wave $I_{s,p}$ refracted (p+1) times on the dioptric plane and p times on the mirror is:

$$R_\perp^{p-1} T_\perp^2 I_e$$

it follows that:

$$\text{modulus } |I_{s,(p+1)}/I_{s,p}| = R_\perp = \sin\gamma \quad (5)$$

On the other hand, $I_{s,(p+1)}$ and $I_{s,p}$ have a phase difference $\psi$ equal to the difference in optical paths:

$$\frac{2\pi n}{\lambda}\left|(M_0 M + M M_1) - M_0 H\right| = \frac{2\pi}{\lambda} 2na \cos r \quad (6)$$

$$\psi = \frac{4\pi a}{\lambda} \frac{n^2}{\sqrt{n^2+1}}$$

Hence:

$$I_{s,(p+1)}/I_{s,p} = \sin\gamma \exp(-j\psi) \quad (7)$$

The total intensity $I_s$ of the reflected radiation is given by:

$$I_s = I_e \exp(-j\psi)\frac{1 - \sin\gamma \exp(j\psi)}{1 - \sin\gamma \exp(-j\psi)} \quad (8)$$

Since the numerator and denominator of the fraction in the second term of (8) are conjugate imaginary quantities, the modulus of the fraction is equal to unity and its argument $\chi$ is twice the argument of the numerator:

$$\chi = 2\arg[1 - \sin\gamma \exp(j\psi)]$$

hence:

$$tg\frac{\chi}{2} = \frac{\sin\gamma \sin\psi}{1 - \sin\gamma \cos\psi} \quad (9)$$

Figure 2:
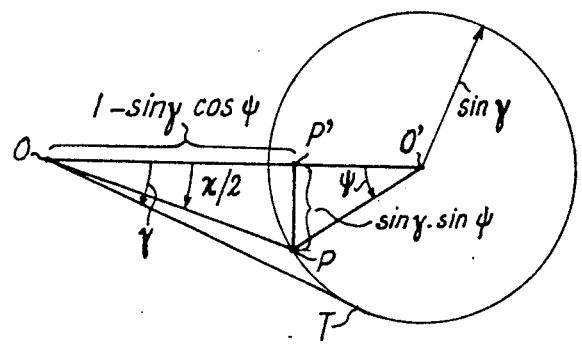
FIG. 2 is used to explain the operation of the device in FIG. 1.

$\chi$ can be obtained as follows (FIG. 2). A circle C of radius $\sin\gamma$ is drawn, centered on the point having the abscissa unity, and a point P having the argument $\psi$, which is projected as P' on OO', is placed on the circle. We than have: $OP' = 1 - \sin\gamma\cos\psi$ and $PP' = \sin\gamma\sin\psi$. Therefore: $\chi/2 = \widehat{P'OP}$. $\chi/2$ has its maximum absolute value of $\pm\gamma$ when the line O P becomes the tangent O T to the circle, i.e. when, by (9):

$$\psi = \pm\left(\frac{\pi}{2} - \gamma\right) \pm 2k\pi$$

To obtain a phase shift $\chi = \pi/2$ between the components polarized perpendicular and parallel to the plane of incidence, it is necessary that $\gamma = \chi/2 = \pi/4$, which gives the following expression for the index of refraction:

$$\sin\gamma = \frac{n^2 - 1}{n^2 + 1} = 1/\sqrt{2}$$

hence:

$$n^2 = 3 + 2\sqrt{2} \approx 6 \text{ hence } n \approx 2.44$$

By replacing $\psi$ by $|\pm\pi/4 \pm 2k\pi|$ and n by its value in (6), we obtain:

$$\frac{a}{\lambda} = 0.44\left(\pm\frac{k}{2} \pm \frac{1}{16}\right)$$

The metal-coated parallel sided plate can be made of zinc selenide for which n=2.67, and the plate can be inclined at an angle slightly different from the Brewster angle, thus reducing the phase-shift between the two components polarized perpendicular and parallel to the incident plane.

Figure 4:
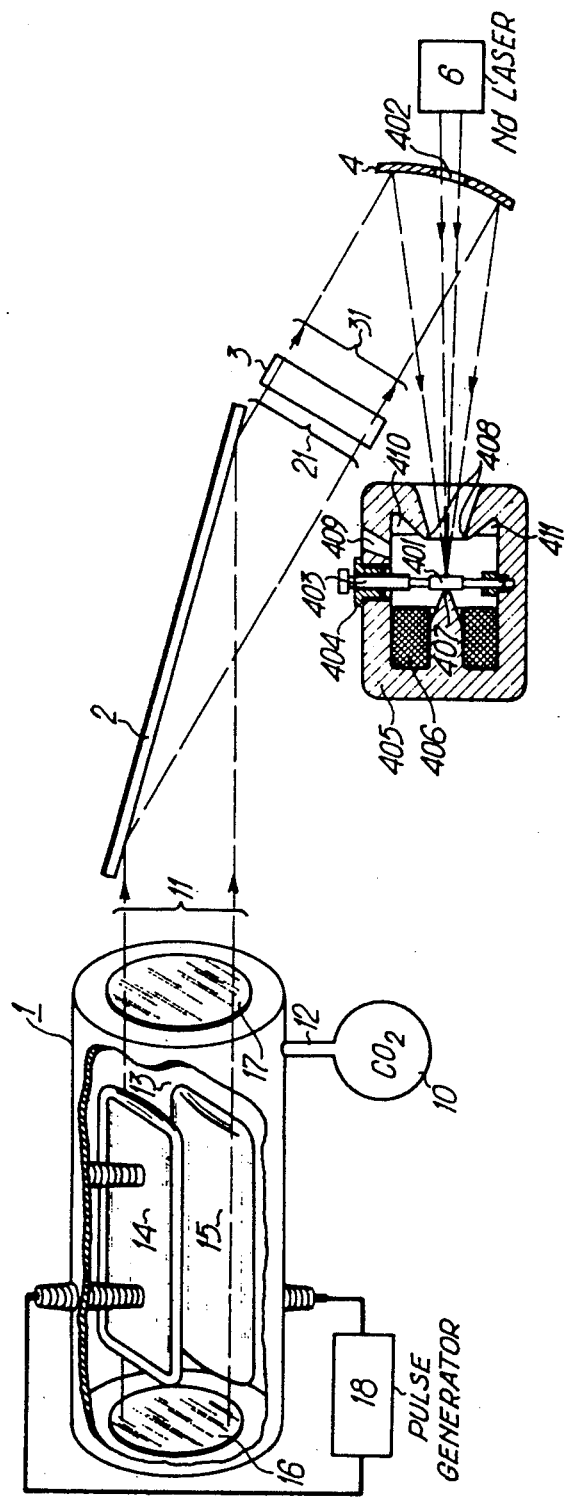
FIG. 4 is a diagram of a device generating a confining wave, comprising a carbon dioxide laser.

FIG. 4 shows a known prior-art carbon dioxide laser 1. $CO_2$ gas from a container 10 is conveyed through a pipe 12 into the laser cavity 13. The cavity contains two slightly convex electrodes 14, 15 having curved edges, between which a source 18 establishes a d.c. voltage or pulses. Electrodes 14, 15 are inclined at 45° to the plane of FIG. 1, which is the incident plane of the Brewster metal-coated parallel sided plate. The laser cavity 13 is bounded by the electrodes, a mirror 16 and a window 17, which is made of material transparent at 10 μm, e.g. zinc sulphide or selenide.

Laser 1 emits a rectilinear polarized beam 11 which falls on the "rectilinear-circular" converter 2 already described with reference to FIG. 1. The incident polarization being at an angle of 45° with respect to the plane of incidence the wave can be considered as the sum of two waves in phase having equal amplitudes and polarized parallel and perpendicular respectively to the plane of incidence on plate 2.

The circular polarized wave 21 coming from plate 2 falls on an azimuthal phase-shifter 3 which converts it either into a confining wave having a first-order positive azimuthal phase-shift, i.e. the sum of a $TE_o$ mode and a $TM_o$ mode in phase quadrature, or into a confining wave having a first-order negative azimuthal phase shift, i.e. the sum of two $TE_2$ modes orthogonal in space and in phase quadrature in time. The confining mode resulting from the latter circular-mode conversion is called [$TE_2$]. The second confining mode is used in preference to the first for confining a plasma, since its electric field is zero at the center.

Figure 3:
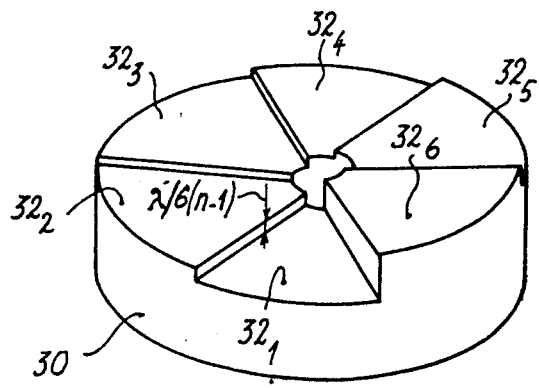
FIG. 3 shows a prior-art device for converting a non-confining wave into a confining wave, forming part of the laser in FIG. 4.

FIG. 3 shows the azimuthal phase-shifter 3. It comprises a circular disc 30 made of material transparent at 10 μm and having a number of steps $32_1 \ldots 32_q$, the number of steps being q and the height h being equal to:

$$h = \lambda/q(n-1)$$

where $\lambda$ is the wave-length of the laser wave.

The azimutally phase-shifted, circular polarized wave 31 is concentrated by a mirror 4 on to a target material 401. Mirror 4 has an aperture 402, the purpose of which will be explained hereinafter. The target material 401 is in the form of a cylinder and held by a screw 403 which rotates in a nut 404 so that the surface of material presented to the laser beam is renewed as appropriate. Nut 404 is secured to armature 405 of an electromagnet energized by a winding 406. As can be seen, the pole 407 of the electromagnet is much narrower than pole 408, i.e. the magnetic field along the incident beam axis decreases with distance from the material, with the result that the rings of plasma formed by the impact of the beam are compressed against the material. The phenomenon can be observed from the side through a hole 409 in the magnet armature.

Instruments 410, 411 are for observing or using the radiation.

Figure 5:
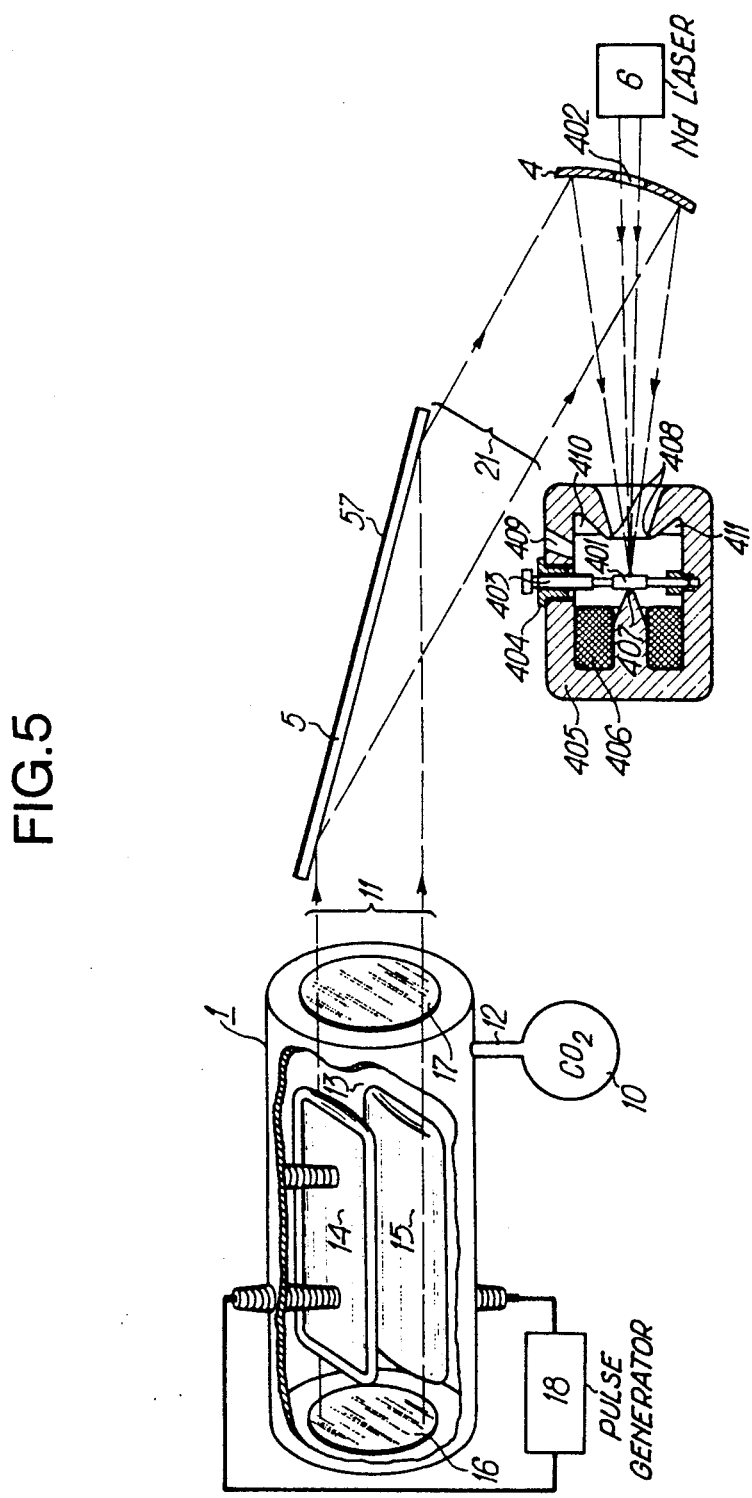
FIG. 5 is a diagram of another device for generating a confining wave, wherein the parallel sided plate forming a mirror and acted upon at the Brewster angle serves both as a quarter-wave plate and an azimuthal phase-shifter.

In FIG. 5, the azimuthal phase-shifter 3 is omitted and its function is performed by the plate 5 having parallel surfaces and forming a mirror. Plate 5 is shown in FIG. 7B and the method of obtaining it is explained with reference to FIG. 7A.

As already stated, beam 11 is partly reflected and partly refracted at the dioptric plane formed by the front surface of plate 5, and is reflected by mirror 57. The circular beam of radius b strikes the mirror in an ellipse having a major axis b/cos i and a minor axis b. If we take q sectors of a circle having the same apex angle in a cross-section of beam 11, there are q corresponding ellipse sectors of equal area. In FIG. 5 it is assumed that q=6 and sectors 51-56 are shown differently shaded.

In practice, the mirror used is of metal or metal-coated glass and a layer of zinc selenide is deposited therein by evaporation and condensation in vacuo. The thickness of the layer depends on the thermal conditions of operation and the duration thereof. The thickness should be the same everywhere even if the mirror comprises steps, the height of which controls the local phase-shifting of the beam.

In dependence on the azimuth $\phi$ ($\phi$ being counted in the beam cross-section), the pitch of the helix causing the azimuthal phase-shift should be:

$$\alpha = \frac{\phi}{2H} - \frac{\lambda}{2 \cos i}$$

or, if the helix is approximated by a stairway made up of q steps in the form of section of an ellipse, the height of each step will be:

$$h = \lambda/2q \cos i$$

Of course, the functions of the "rectilinear-circular" polarization converter and the azimuthal phase-shifter can be separated by inserting, in the path of the beam, a metal-coated parallel sided plate as in FIG. 1 and an azimuthal phase-shifting mirror as in FIG. 7B, but without a transparent parallel sided plate.

In an attempt to produce thermonuclear fusion, the effect of a carbon dioxide laser can be associated with the action of a neodymium laser. The first laser, which has a higher efficiency, prepares the reaction, whereas the reaction is triggered by the second laser, which has a lower efficiency but can reach higher instantaneous powers. To this end, the focusing mirror 4 has an aperture 402 for the beam from the neodymium laser 6. The neodymium laser is incorporated in a device emitting a confining wave; a confining wave generator of the aforementioned kind at 1.06 μm is described in the aforementioned patent application.

Figure 6:
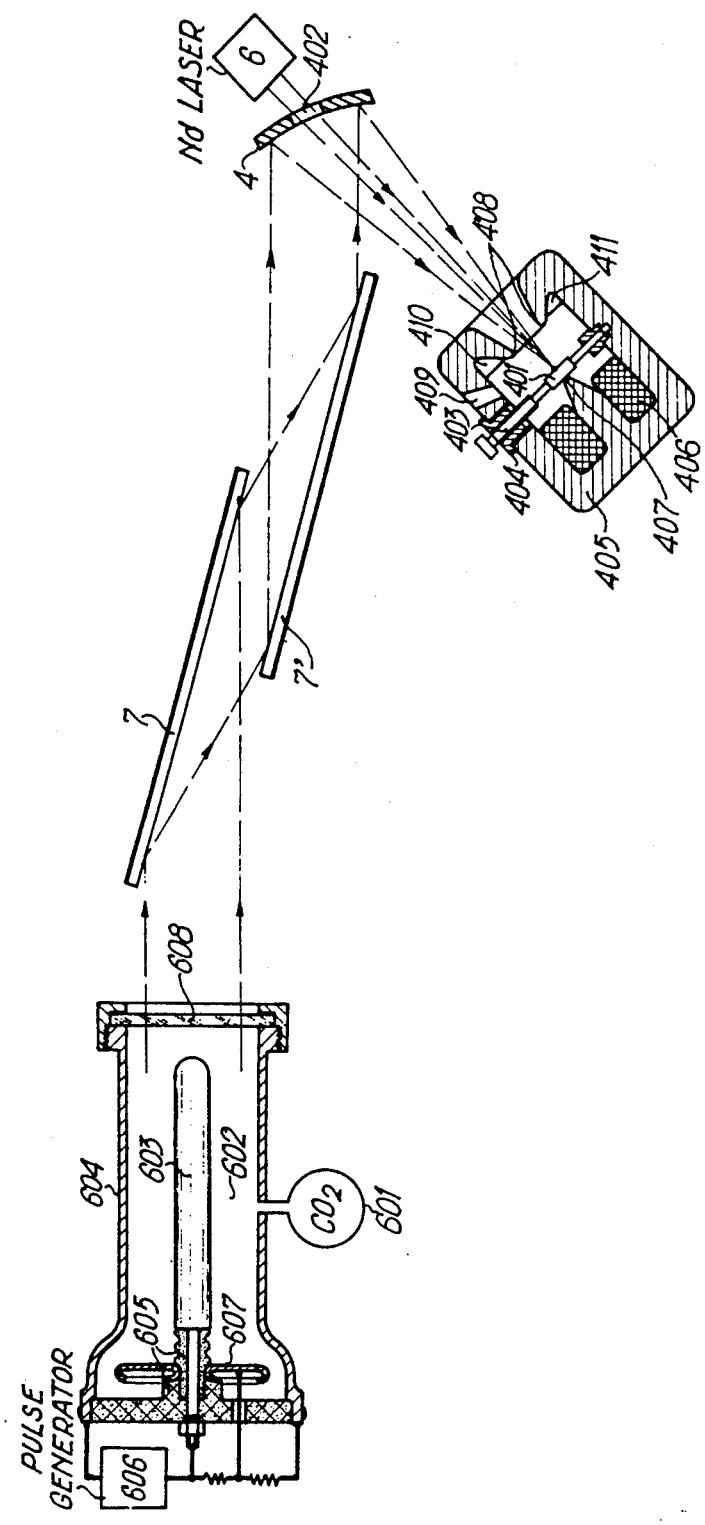
FIG. 6 is a diagram of another device generating a confining wave wherein the carbon dioxide laser emits a $TM_o$ mode.

Referring to FIG. 6, the $CO_2$ laser is of the kind emitting a $TM_o$ mode wave. $CO_2$ gas from a vessel 601 is contained in a coaxial cavity 602 formed by an inner conducting cylinder 603 and an outer conducting cylinder 604 mechanically connected by an insulating holder 605, and a source 606 establishes a large d.c. or pulsed voltage difference between the cylinders. The laser cavity is bounded by a mirror 607 and a germanium window 608. It is known that a laser of this kind emits on the $TM_o$ mode.

The mode converter 7-7' converts the $TM_o$ wave into a $TE_2$ confining wave. It is known from the aforementioned patent application that the $TE_2$ mode is deduced from the $TM_o$ mode, in which the electric lines of force are radii, by taking the lines symmetrical with the radii with respect to a given direction. If $\phi$ is the angle of a $TM_o$ mode radius with respect to the predetermined direction, the angle between the $TE_2$ mode electric field and the same direction is $-\phi$. Consequently, at each point on the plane, the electric field angle must be inverted with respect to a given direction. A half-wave plate can be used for this mode conversion. To obtain a half-wave plate, we must have:

$$\chi = \pi \quad \text{hence} \quad \gamma = \pi/2 \quad \text{and} \quad n = \infty$$

Even if we take germanium, which has a high refractive index ($n^2 = 16$), we find by formula (4) that:

$$\sin \gamma = 0.88 \quad \text{hence} \quad \gamma = 62° \quad \text{and} \quad \chi = 124°$$

To obtain $\chi = 180°$, we take two quarter-wave plates 7 and 7' of the kind in FIG. 1, in cascade as shown in FIG. 6. In other respects, the reference numbers in FIG. 6 are the same as in FIGS. 4 and 5.

Since the $TM_o$ laser wave is symmetrical with respect to any plane extending through the beam axis and since the quarter-wave plates 7,7' are symmetrical with respect to the plane of FIG. 6, the confining $TE_2$ wave which they produce by converting the $TM_o$ wave is symmetrical with respect to the plane of FIG. 6. Mirror 4 is an ordinary concave mirror.

Figure 7A:
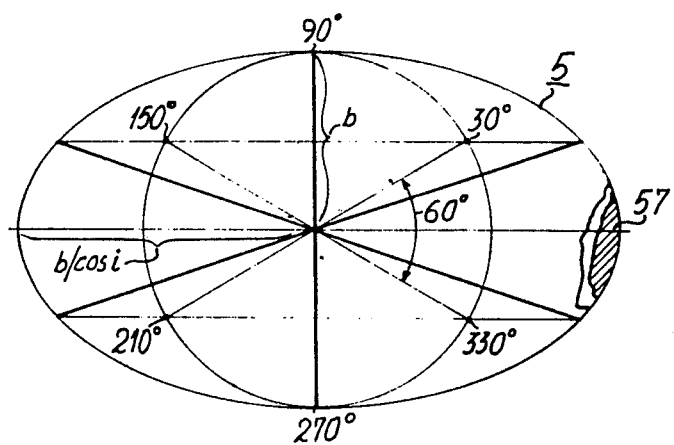
FIGS. 7A and 7B show a metal-coated plate having parallel surfaces and serving as a "rectilinear-circular" converter and an azimuthal phase-shifter.
Figure 7B:
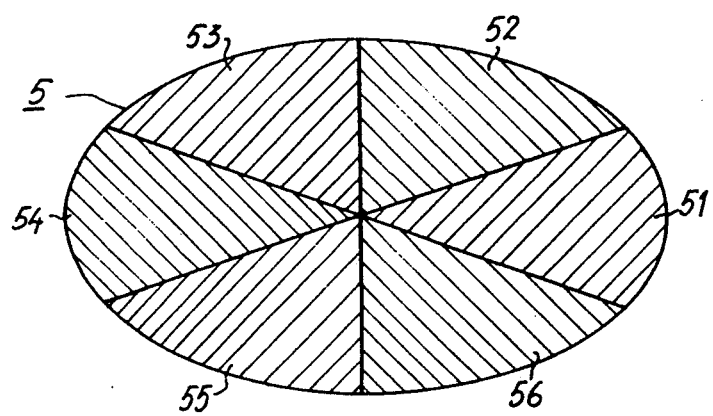

Furthermore, a helical or stepped mirror as described in FIGS. 7A and 7B can convert a $TM_o$ wave from a laser as in FIG. 6 to a $TE_2$ circular mode wave without using mirrors 7,7' comprising a dielectric layer. However, the cost of a helical mirror is much greater than that of two plane mirrors comprising a dielectric layer, and the mode converter in FIG. 6 has the advantage of simplicity.

I claim:

1. A laser device emitting a confining wave beam in the far infrared range for confining charged particles originating from a target impacted by said beam, said laser device comprising:
   a laser producing a beam of a linear polarized wave having a non-confining mode for charged particles;
   a polarization conversion device converting the linear polarization of the laser wave beam into a circular polarization wave beam, said converting device including a parallel sided plate of dielectric material having a metal coated face forming a mirror, said plate receiving the linear polarized laser wave beam at an incidence near the Brewster incidence and with its polarization direction at 45° with respect of the incidence plane, the thickness and index of refraction of the plate material being selected so that the component of the incident beam polarized perpendicular to said incidence plane is, at the outlet of said parallel sided plate, in phase quadrature with the component polarized parallel to said incidence plane;
   a device receiving the beam output by said polarization conversion device for converting the circular polarized, non-confining wave beam into a circular polarized, confining wave beam;
   means for producing a magnetic field coaxial with said circular polarized, confining wave beam; and
   means for concentrating said circular polarized, confining wave beam on to said target.

2. A laser device emitting a confining wave beam in the far infrared range for confining charged particles as set forth in claim 1 wherein the laser is a carbon dioxide laser.

3. A laser device emitting a confining wave beam in the far infrared range for confining charged particles originating from a target impacted by said beam, said laser device comprising:

a laser producing a beam of a linear polarized wave having a non-confining mode for charged particles;

a conversion device for simultaneously converting the linear polarization of the laser wave beam into a circular polarization wave beam and the circular polarization, non-confining wave beam into a circular polarization, confining wave beam, said conversion device including a plate of dielectric material having a first plane face and a second metal coated face forming a mirror said second face being divided into ellipse sectors of equal area forming the steps of a stair having a common height equal to $\lambda/2q \cos i$ where $\lambda$ is the laser wavelength, q is the number of steps of said stair and i is the Brewster angle, said plate receiving the linear polarized laser wave beam at an incidence near the Brewster incidence and with its polarization direction at 45° with respect to the incidence plane, the thickness and index of refraction of the plate material being selected so that the component of the incident beam polarized perpendicular to said incidence plane is, at the outlet of said plate, in phase quadrature with the component polarized parallel to said incidence plane;

means for producing a magnetic field coaxial with said circular polarized, confining wave beam; and means for concentrating said circular polarized, confining wave beam on to said target.

4. A laser device emitting a confining wave beam in the far infrared range for confining charged particles originated from a target impacted by said beam, said laser device comprising:

a laser producing a beam of a wave in the $TM_o$ mode, non-confining for charged particles;

a mode conversion device converting the $TM_o$ mode laser wave beam into a [$TE_2$] mode formed of two $TE_2$ modes orthogonal with each other in space and in phase quadrature with each other in time, said mode converting device including a first and a second parallel sided plate of dielectric material, each having a metal coated face forming a mirror, said first plate receiving the $TM_o$ mode wave beam at an incidence near the Brewster indicence and with its polarization plane at 45° with respect to the incidence plane and said second plate receiving the wave beam issuing form the first plate at an incidence near the Brewster incidence and with its polarization plane at 45° with respect to the incidence plane, the thickness and the refraction index of the material of the two plates being selected so that the component of the incident beam on the first plate perpendicular to the incidence plane has, at the outlet of said first plate, a first phase shift with respect to the component polarized parallel to said incidence plane, the component of the incident beam on the second plate perpendicular to the incidence plane has, at the outlet of said second plate, a second phase shift with respect to the component polarized parallel to said incidence plane, and the sum of said first and second phase shift is 180° means for producing a magnetic field coaxial with the wave beam issuing from said second plate; and means concentrating said [$TE_2$] mode confining wave beam on to said target.

* * * * *